United States Patent
Schmidt et al.

(10) Patent No.: US 9,289,833 B2
(45) Date of Patent: *Mar. 22, 2016

(54) ACCESSORY OF A MACHINE DRILL AND CONTROL METHOD

(75) Inventors: Peer Schmidt, Lindau (DE); Roland Schaer, Grabs (CH); Alexander Liniger, Zurich (CH); David Leuzinger, Zurich (CH)

(73) Assignee: HILTI AKTIENGESELLSCHAFT, Schaan (LI)

( * ) Notice: Subject to any disclaimer, the term of this patent is extended or adjusted under 35 U.S.C. 154(b) by 1117 days.

This patent is subject to a terminal disclaimer.

(21) Appl. No.: 13/334,558

(22) Filed: Dec. 22, 2011

(65) Prior Publication Data

US 2012/0162406 A1 Jun. 28, 2012

(30) Foreign Application Priority Data

Dec. 23, 2010 (DE) .......................... 10 2010 064 111

(51) Int. Cl.
*B23B 49/00* (2006.01)
*B25F 5/02* (2006.01)

(52) U.S. Cl.
CPC ................ *B23B 49/00* (2013.01); *B25F 5/021* (2013.01)

(58) Field of Classification Search
CPC ..................................................... B23B 49/00
See application file for complete search history.

(56) References Cited

U.S. PATENT DOCUMENTS

| | | | |
|---|---|---|---|
| 6,583,869 B1 * | 6/2003 | Sheridan | G01S 17/87 356/153 |
| 7,200,516 B1 | 4/2007 | Cowley | |
| 7,375,361 B2 * | 5/2008 | Turner | B25H 1/0092 250/559.29 |
| 7,752,763 B2 * | 7/2010 | Yamamoto | B23B 49/00 33/334 |
| 7,992,311 B2 * | 8/2011 | Cerwin | B23B 49/006 33/286 |
| 8,810,802 B2 * | 8/2014 | Schmidt et al. | 356/614 |
| 8,832,954 B2 * | 9/2014 | Atwell | G01B 11/005 33/503 |
| 2004/0252293 A1 * | 12/2004 | Laver | G01B 11/26 356/138 |
| 2005/0187477 A1 * | 8/2005 | Serov | A61B 5/0261 600/476 |
| 2009/0165313 A1 | 7/2009 | Borinato | |

FOREIGN PATENT DOCUMENTS

| | | |
|---|---|---|
| CN | 1724223 A | 1/2006 |
| DE | 102010003489 A1 | 10/2010 |

(Continued)

OTHER PUBLICATIONS

European Search Report, EP 11 19 0219, mailed Apr. 2, 2012.

(Continued)

*Primary Examiner* — Sath V Perungavoor
*Assistant Examiner* — James Pontius
(74) *Attorney, Agent, or Firm* — McAndrews, Held & Malloy, Ltd.

(57) ABSTRACT

An accessory that can be connected to a machine drill is provided. A projector is provided to project a first light spot and a second light spot to a work piece to be processed. A camera is provided to record the first light spot and the second light spot in an image. A processing device is provided to determine an incline of the machine drill in reference to the work piece, based on a first distance of the first light spot from a reference point recorded in the image and a second distance of the second light spot from the reference point recorded in the image. A display device is coupled to the processing device and displays the determined incline. The light spots may be embodied punctual or planar.

11 Claims, 4 Drawing Sheets

(56) References Cited

FOREIGN PATENT DOCUMENTS

| | | |
|---|---|---|
| JP | 05-071933 | 3/1993 |
| JP | 08-278117 | 10/1996 |
| JP | 2007229888 | 9/2007 |
| WO | WO2006074609 | 7/2006 |

OTHER PUBLICATIONS

State Intellectual Property Office of the People's Republic of China, Notification of the First Office Action, in Application No. 201110427899.1 dated May 6, 2015 (17 pages).

Japanese Office Action for JP Application No. 2011-277311, dated Jul. 25, 2015. (4 pages).

* cited by examiner

ACCESSORY OF A MACHINE DRILL AND CONTROL METHOD

RELATED APPLICATIONS

This application claims priority to German Patent Application DE 10 2010 064 111.1, filed Dec. 23, 2010, and entitled "Hilfseinrichtung einer Bohrmaschine und Steuerungsverfahren" ("Accessory for a Power Drill and Control Method"), the entire content of which is incorporated herein by reference.

BACKGROUND OF THE INVENTION

The present invention relates to an accessory for a machine drill for the perpendicular alignment of the machine drill in reference to a work piece and a related control method.

BRIEF SUMMARY OF THE INVENTION

An accessory according to aspects of the present invention is connected to a machine drill or can be detachably fastened at a machine drill. The accessory may comprise detachable or permanent means for fastening at the machine drill, e.g., brackets, sleeves, clamps, screws. A projector is provided to project a first light spot and a second light spot onto a work piece to be processed. The projector emits in the operating direction towards the work piece and/or a surface to be processed. A camera is provided to record a first light spot and a second light spot in an image. A processing device, based on a first distance of the first light spot from a reference point recorded in the image and a second distance of the second light spot from the reference point recorded in the image, determines an incline of the machine drill in reference to the work piece. A display device is coupled with a processing device and displays the incline determined. The light spots may be embodied punctual or planar. The distances are beneficially determined from a center or a focal point of the light spot to the reference point. If the light spots show characteristic edges or points the distance therefrom to the reference point may be used.

A control method, according to an embodiment of the present invention, for an accessory to align a machine drill in reference to a operating surface provides the following steps: A first light spot and a second light spot are projected by a projector to the operating surface. A camera records the first light spot and the second light spot in an image. A first distance of the first light spot from a reference point recorded in the image and a second distance of the second light spot from the reference point recorded in the image are determined by a processing device. The first distance and the second distance may be virtual representations of the corresponding distances between the light spots on the operating surface and a virtual axis, e.g., optic axis of the camera. An incline of the machine drill in reference to the operating surface is determined based on the first distance and the second distance and displayed via a display device.

One embodiment provides that the projector emits a first light beam in a first direction to create the first light spot, a second light beam in a second direction to create the second light spot, and a third light beam to create a third light spot, wherein an azimuth angle of the first light beam, in reference to the optic axis of the camera, and an azimuth angle of the second light beam, in reference to the optic axis of the camera, are different, and an amplitude of the first light beam in reference to the optic axis and an amplitude of the third light beam in reference to the optic axis are different. The emission of three light beams in different orientations and inclines is used to determine the distance and the incline of the optic axis from the light spots recorded in the image. The three light beams allow determination of the incline and distance in absolute values. The determined values can be displayed to the user, for example in a numeric form.

One embodiment provides that the first light beam is inclined with an amplitude greater than about 10 degrees in reference to the optic axis and the third light beam with an amplitude of less than about 5 degrees in reference to the optic axis. The illustration of the light spots in an image coincides with a loss of information due to the projection. The alignment of the two light beams with different amplitudes to the optic axis and/or an image level of the image is sufficient to allow reconstruction of the information.

One embodiment provides that the camera and the projector are arranged on a platform, which is pivotal in reference to an operating axis of the machine drill. In particular, an amplitude between the operating axis and an optic axis of the camera can be adjusted. The accessory instructs the user how to guide the optic axis perpendicular in reference to the operating surface, thus holding the drill according to the amplitude set.

One embodiment provides that the display device comprises a projector projecting a display to the work piece. The projector of the display device is oriented in the same direction as the camera. The emission of light to display information via the projector occurs in the operating direction, i.e. in the direction towards the tool.

BRIEF DESCRIPTION OF SEVERAL VIEWS OF THE DRAWINGS

The following description explains the invention with reference to exemplary embodiments and figures.

Identical or functionally equivalent elements are identified in the figures with the same reference characters, unless stipulated otherwise.

DETAILED DESCRIPTION OF THE INVENTION

Figure 1:
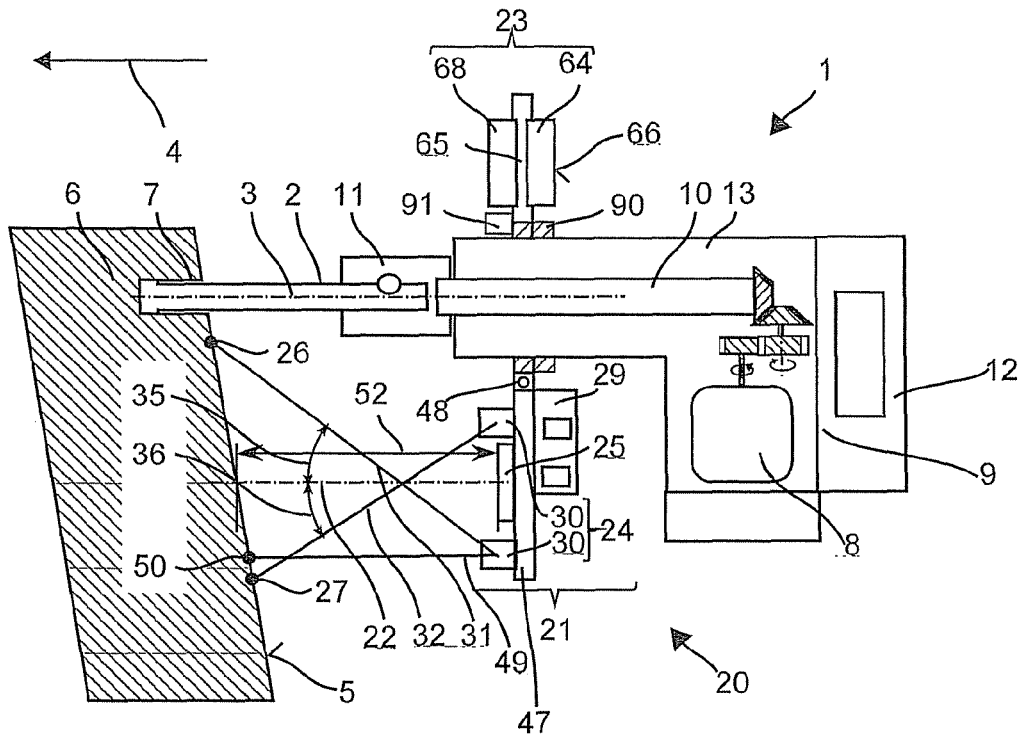
FIG. 1 illustrates a machine drill with an accessory formed in accordance with an embodiment of the present invention.

FIG. 1 shows an exemplary machine drill 1, formed in accordance with an embodiment of the present invention, which can drive a drill 2 rotationally about an operating axis 3. A user presses the drill 2 in the operating direction 4 to a operating surface 5 of a work piece 6 to be processed. Here, the rotating drill 2 creates a bore hole 7 in the work piece 6.

The drill 2 comprises a cutting element made from hard metal, e.g., sintered tungsten carbide and/or diamond, which shaves material off the work piece 6 by rotating about the axis. The shavings can be removed via a helical shaft or a hollow shaft of the drill. The cutting elements may also be arranged along a circular facial area of a cup-shaped drill.

A drive may comprise a motor 8, e.g., an electric motor, a transmission 9, and a drive screw 10. The drive screw 10 transfers a torque to a tool accept 11, into which the drill 2 can be inserted. A user can hold and/or guide the machine drill 1 via a handle 12, which preferably is arranged at an end of a machine housing 13 distanced from the tool accept 11.

An auxiliary device 20 renders it easier for the user to align and guide the operating axis 3 of the machine drill 1 in a desired angle, preferably perpendicularly, in reference to the processed operating surface 5. An optic measuring device 21 can determine the orientation of its optic axis 22 in reference to the work piece 6. A display device 23 visualizes the present orientation to the user. Additionally, the auxiliary device 20 can determine a present drill depth and visualize it via the display device 23.

Figure 2:
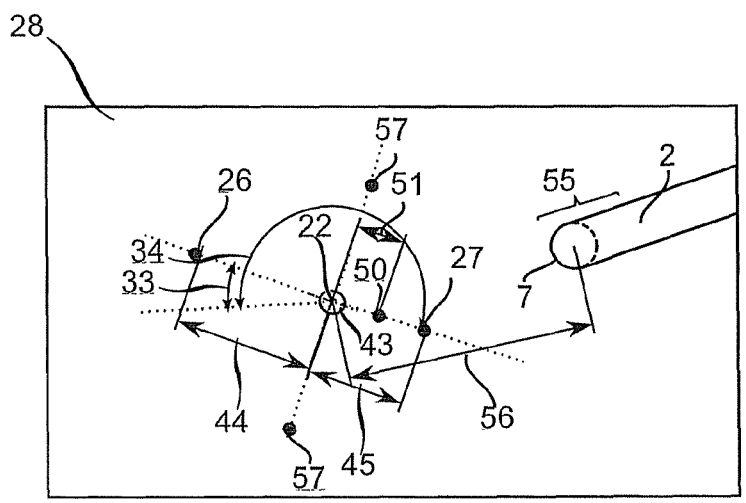
FIG. 2 illustrates an image recorded by an accessory formed in accordance with an embodiment of the present invention.
Figure 3:
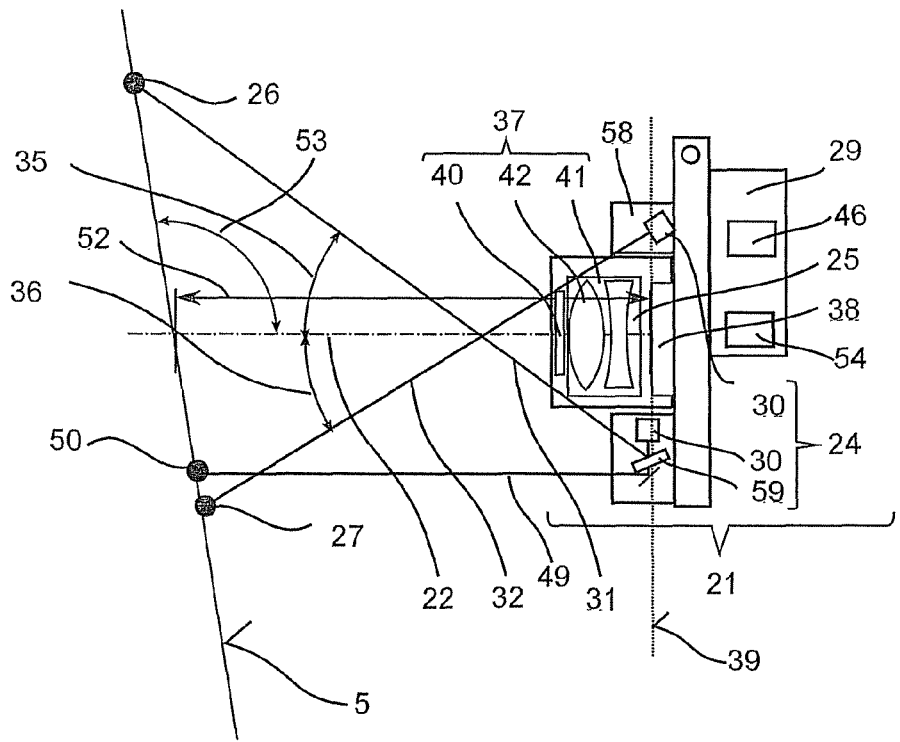
FIG. 3 illustrates a detail of an optic measuring device of an accessory formed in accordance with an embodiment of the present invention.

The optic measuring device 21 of the auxiliary device 20 comprises a projector 24 and a camera 25, which is shown in detail in FIG. 3. The projector 24 creates at least a first light spot 26 and a second light spot 27 on the operating surface 5. The camera 25 is preferably arranged on the optic axis 22 and records the operating surface 5 and the light spots 26, 27 created thereon in an image 28 (FIG. 2). Based on the image 28 and the light spots 26, 27 recorded, a processing device 29 determines an orientation of the optic axis 22 in reference to the operating surface 5.

An example of a projector 24 includes two laser light sources 30, e.g., laser diodes, which create a first light beam 31 and a second light beam 32. The first light beam 31 is emitted in a first direction and a second light beam 32 in a second direction, which is different from the first direction.

The direction of the light beams 31, 32 is stated in the following in the form of angular coordinates in reference to the optic axis 22. An amplitude describes the incline of a light beam in reference to the optic axis 22 in a level defined by the light beam and the optic axis 22. An azimuth angle represents the orientation of the light beam in a rotary direction about the optic axis 22 and can be determined in a projection to a level perpendicular in reference to the optic axis 22 (cf. FIG. 2).

Preferably, a first azimuth angle 33 of the first light beam 31 and a second azimuth angle 34 of the second light beam 32 differ from each other. The first azimuth angle 33 may be different by 180 degrees from the second azimuth angle 34, i.e. the two light beams 31, 32 are located in a level with the optic axis 22. A first amplitude 35 of the first light beam 31 and a second amplitude 36 of the second light beam 32 may be identical. The amplitudes 35, 36 range preferably from about 10 degrees to about 60 degrees. The projector 24 may emit the light beams 31, 32 intersecting the optic axis 22.

The first light beam 31 leads to the first light spot 26 and the second light beam 32 to the second light spot 27 on the operating surface 5. The relative orientation of the optic axis 22 to the work piece 6 can be determined from the relative position of the first and the second light spot in reference to the optic axis 22 and the distances. The light beams 31, 32 emitted by the projector 24 may show a circular cross section or any other shape. Light spots with small diameters are preferred due to their easily determined position, however differently shaped light spots (e.g., non-circular shapes, arrows, crosses) may also be projected to the work piece 6.

The camera 25 records the operating surface 5 with the light spots 26, 27 on the work piece 6. The camera 25 can include a display optic 37, which displays the operating surface 5 on a spatially resolving photo sensor 38. The photo sensor 38 converts the incoming light into an image 28, which, spatially resolved in a n image level 39, displays an intensity of light. The light spots 26, 27 are beneficially of such brightness that displayed in the image 28 they show the highest light intensity. A color filter 40, adjusted to the color of the light spots 26, 27, may be arranged in front of the photo sensor 38 in order to amplify the contrast.

The display optic 37 may include an objective 41 comprising one or more lenses 42. The lenses 42 are preferably arranged centrally and perpendicularly in reference to the optic axis 22. Instead of or in addition to the objective 41, an aperture may also be provided. The projector 24 and the camera 25 are arranged off-set in reference to each other such that the first light spot 26 is detected by the camera 25 at a direction different from the first direction and the second light spot 27 at a direction different from the second direction.

A processing device 29 reads the image 28 from the camera 25, particularly the spatially resolving photo sensor 38. The brightest spots of the image are interpreted as the virtual displayed light spots 26, 27. The position of the displayed light spots 26, 27 compared to a reference point 43 in the image 28 or in the image level 39 is determined by a processing device 29. In the image 28 a first distance 44 of the first light spot 26 from the reference point 43 is determined, and a second distance 45 of the second light spot 27 from the reference point 43 is determined. The distances measured are virtual. The measurement may include the determination of the coordinates of the light spots 26, 27 in the image. For example, in order to determine the distances 44, 45, distances allocated to coordinates are stored in a reference table in a storage component 46, such as RAM, flash-RAM, of the processing device 29. The reference point 43 may be set arbitrarily. Preferably, the reference point 43 represents the intersection of the image level 39 to the optic axis 22 or a center of the image 28.

An operating mode of the accessory 20 supports the user in a perpendicular alignment of the machine drill 1 in reference to the work piece 6. The accessory 20 is fastened at the machine drill 1 such that the optic axis 22 is parallel in reference to the operating axis 3. The processing device 29 transmits a control signal, which indicates the optic axis 22 being inclined in reference to the work piece 6 when the first distance 44 is different from the second distance 45. The control signal indicates in which direction the greater of the distances 44, 45 lies. The display device 23 visualizes the control signal to the user. For example, the display device 23 displays an arrow indicating the direction. This way, the user is instructed to pivot the handle 12 in the direction about the bore hole until the distances 44, 45 are identical in size and the optic axis 22 is perpendicular in reference to the work piece 6.

The optic measuring device 21 may be arranged on a platform 47 pivotal in reference to the operating axis 3. In particular, an amplitude is adjustable between the optic axis 22 and the operating axis 3. The platform may be fastened at the housing of the machine drill 1 via a ball joint 48 or pivotal joint. A user adjusts the desired, e.g., non-parallel, orientation of the optic axis 22 in reference to the operating axis 3. The processing device 29 and the display device 23 instruct the user to guide the machine drill 1 with the optic axis 22 perpendicularly in reference to the work piece 6. A drilled bore hole subsequently shows an incline in reference to the operating surface 5, which is equivalent to the adjusted orientation of the operating axis 3 in reference to the optic axis 22.

In another operating mode the accessory 20 may determine the absolute angle of the optic axis 22 in reference to the operating surface 5. The projector 24 creates a third light beam 49, which is preferably parallel in reference to the optic axis 22 and off-set in reference to the optic axis 22. Instead of being parallel, the third light beam 49 may also show a slight amplitude, compared to the first light beam 31, in reference to the optic axis 22, e.g., ranging from about 0 to about 5 degrees. A resulting third light spot 50 is detected by the camera 25. A virtual third distance 51 of the displayed light spot 50 from the reference point 43 in the image 28 is determined. A distance 52 of the camera 25 from the work piece 6 is determined based on the third distance 51. In the image 28 the third distance 51 increases with the distance 52 reducing. The incline 53 of the optic axis 22 in reference to the operating surface 5 can be determined and quantified absolutely based on the distance 52, the first distance 44 and the second distance 45 and the amplitude 35 of the first light beam 31 and the amplitude 36 of the second light beam 32. Preferably, amplitudes 35 allocated to first and second distances are stored in the storage element 46 for different distances 52. The display device 23 displays the absolute angle, preferably in a numeric form.

Another embodiment provides that the first light beam 31 and the second light beam 32 comprise different amplitudes 35, 36 in reference to the optic axis 22. The two light beams 31, 32 may extend in a level which includes, for example, the optic axis 22. Preferably the first light beam 31 extends parallel to the optic axis 22, and the second light beam inclined in reference to the optic axis 22. Using the optic axis 22 as a reference point 43, the absolute incline 53 of the optic axis 22 in reference to the operating surface 5 can be determined from the first distance 44 and the second distance 45.

The photo sensor 38 may comprise a plurality of photosensitive cells, which are arranged on a grid. Coordinates of a light spot are equivalent to a cell and perhaps column of the cell respectively illuminated by the light spot 26, 27. A cell can be determined as a reference point 43. The photo sensor 38 may include a CCD chip or an APS sensor, for example.

The camera 25 can record the bore hole 7 in the operating surface 5 and the drill 2 in the image 28. The processing device 29 includes an image detection 54 identifying the bore hole 7 and determining its coordinates in the image 28. The image recognition 54 may identify first the drill 2, for example, based on its oblong form and/or based on the known orientation of the drill 2 in the image 28, which results from a fixed or known arrangement of the camera 25 in reference to the drill 2. The coordinates of one end 55 of the visible part of the drill 2 are equivalent to the coordinates of the bore hole 7. In the image 28 a distance 56 of the bore hole 7 is determined from the reference point 43. The distance 56 is a measure for the distance 52 of the camera 25 from the bore hole 7 and thus the operating surface 5. The processing device 29 can determine a distance of the machine drill 1, based on the measurement, and transmit it for visualization to the display device 23. The distance 52 can also be used to determine the absolute angle 53.

The above-described embodiments may determine an incline deviating from the perpendicular or as an absolute angle 53 of the optic axis 22 in reference to the work piece 6 in a first level. A further development provides additional light beams, which show azimuth angles different by 90 degrees in reference to the first and second light beam 31, 32. The processing of the light spots 57 of the other light beams can occur similar to the first and second light beam 31, 32. This way the incline of a second level is determined in reference to a first perpendicular level. In order to determine the absolute angle 53, additionally the third light beam 49 may be used, which in reference to the optic axis 22 shows a different amplitude than the other light beams 31, 32.

In another embodiment three light beams are provided with different orientations, with at least two of them showing different azimuth angles and at least two of them showing different amplitudes. In addition to or instead of the third light beam 49 the measuring of the distance 56 of the bore hole 7 from the optic axis 22 in the image 28 can be used for determining the distance.

The projector 24 may be composed of several individual independent laser light sources 30. The laser diodes 30 may be arranged according to the predetermined directions of the laser beams aligned in a housing 58. The projector 24 may also comprise a beam splitter 59, in order to split the light beam into two light beams 31, 49. The beam splitter 59 may for example include a glass plate or a fiberglass bundle.

Figure 4:
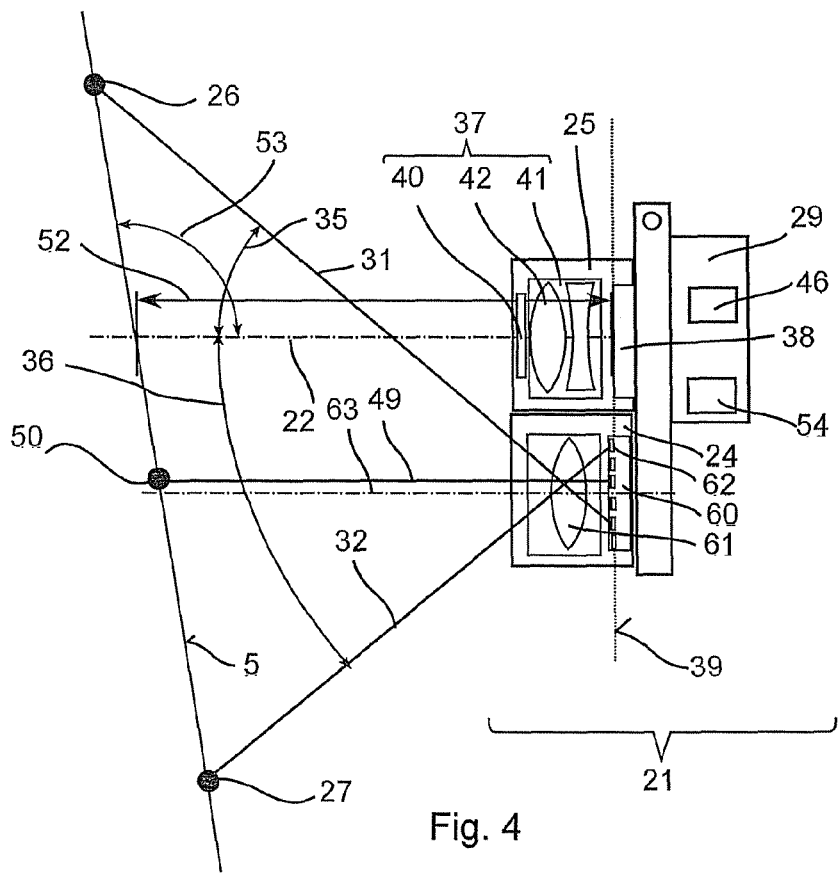
FIG. 4 illustrates a detail of an optic measuring device of an accessory formed in accordance with an embodiment of the present invention.

In one embodiment the projector 24 alternatively or additionally comprises a self-illuminating monitor 60 and a display optic 61 (FIG. 4). The monitor 60 may, for example, represent a background illuminated liquid crystal display, a matrix of light diodes, etc. Symbols composed of several image spots 62 may be displayed on the monitor 60. The display optic 61 displays the image shown on the monitor 60 to on the operating surface 5. The display optic 61 may comprise one or more lenses arranged along an optic axis 63 of the display optic 61. The optic axis 63 extends through the monitor 60, preferably through the center of the monitor 60. Image spots near the optic axis 63 lead to largely parallel light beams in reference to the optic axis 22, while image spots near the edge of the monitor lead to light beams 31, 32 inclined in reference to the optic axis 63 when projected to the operating surface 5. The incline of the light beams can be adjusted by the focus of the display optic 61.

Figure 5:
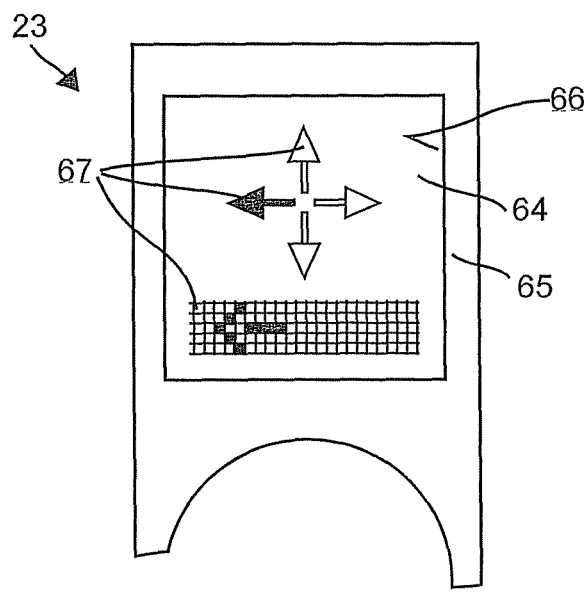
FIG. 5 illustrates a monitor of a display device of an accessory formed in accordance with an embodiment of the present invention.

The display device 23 comprises a monitor 64 fastened at a carrier 65 of the accessory 20. The monitor 64 faces the user with a readable area 66, i.e. oriented opposite the operating direction 4. When guiding the machine drill 1 in the operating direction 4 the user can read the information on the monitor 64. Several electro-optic segments 67 can be switched independent from each other between a light and a dark state (FIG. 5). The segments 67 can be self-illuminating, e.g., a cell or a matrix of light diodes, or covering a background illumination, e.g., several liquid crystal cells. The segments 67 can be embodied in the form of arrows, which are arranged rotated in 90 degree steps. In an incline of the optic axis 22 in reference to the operating surface 5 one of the segments 67 each is activated according to the control signal of the processing device 29. The segments 67 can also be embodied as a multitude of image spots on a grid, which activated together form arrows, numbers, letters, etc. The example of FIG. 5 shows a group of segments 67 switched dark, which display an incline towards the right and thus prompt the user to pivot the machine drill 1 towards the left. The segments 67 are arranged on an area of the accessory 20 facing away from the tool 2. The user can read the displayed directions directly on the accessory 20.

Figure 6:
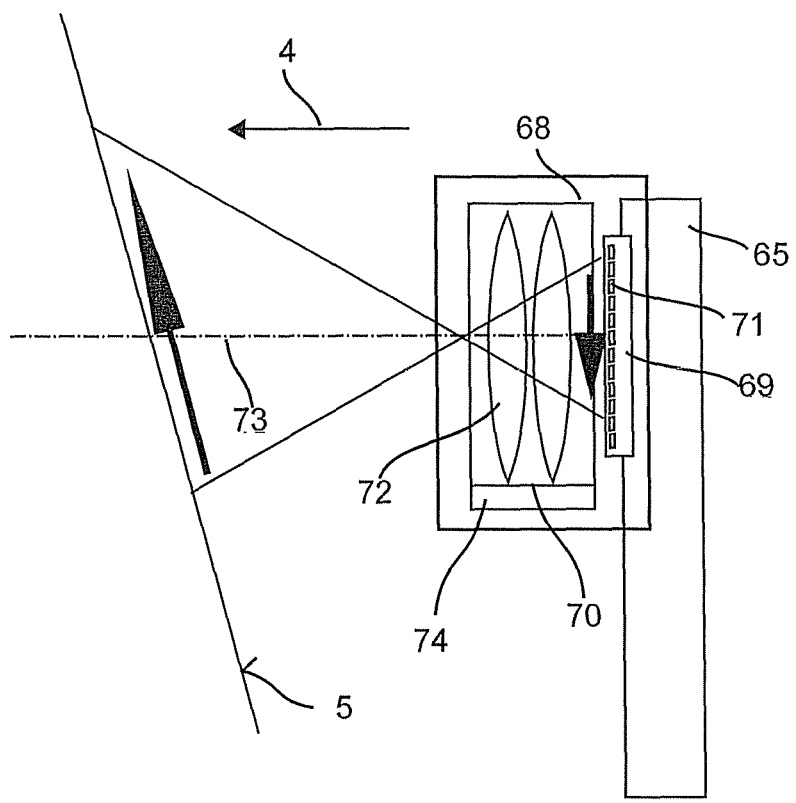
FIG. 6 illustrates a projector of a display device of the accessory formed in accordance with an embodiment of the present invention.

For example, the display device 22 comprises a projector 68, which projects information to be displayed by the display device 22 to the operating surface 5 (FIG. 6). The projector 68 points in the operating direction 4. The projector 68 may comprise a self-illuminating monitor 69 and a display optic 70.

The monitor 69 comprises several electro-optic elements 71 that can be addressed individually. Each of the electro-optic elements 71 can emit light when switched on and when switched off does not emit any light. For example the electro-optic elements 71 may represent background illuminated liquid crystal displays, punctual diodes or diodes with a different geometric design, a field of micro-reflectors illuminated by a lamp, etc. As an example, the monitor 69 is shown with several electro-optic elements 71 arranged on a grid. The image spots may be lit individually or in groups, in order to display one or more desired symbols. The symbols are arrows, numbers, letters, etc. The measuring device 21 controls the projector 68.

Here, depending on data transferred by the measuring device 21, different groups of the electro-optic elements 71 are switched lit. The groups differ in pairs at least in one element 71, which is switched lit for one group and for the other group is switched off.

The display optic 70 displays symbols shown on the monitor 69 on the operating surface 5. The display optic 70 comprises an objective 72 of one or more lenses. A focus and a focal point of the objective 72 may be adjustable. For example, the objective 72 may be moved along its optic axis 73 by a sled 74. Alternatively the objective 72 may comprise a liquid lens, with its focus being adjustable by applying an electric field.

Figure 7:
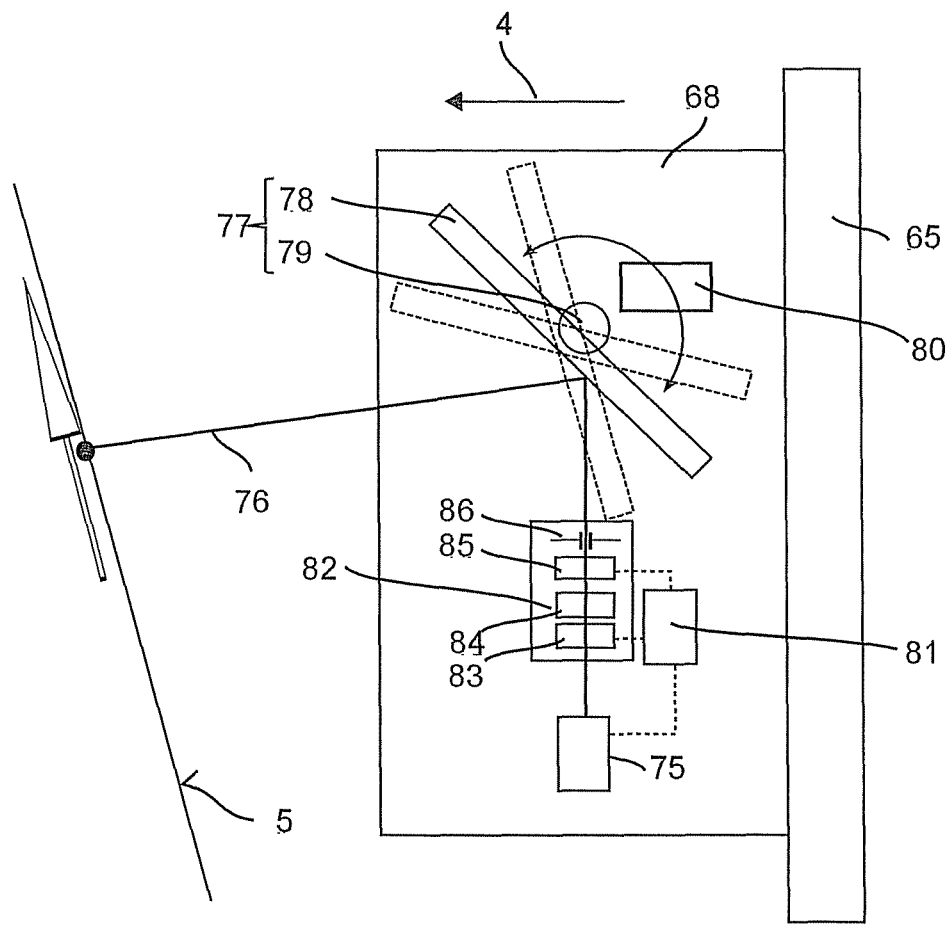
FIG. 7 illustrates a projector of a display device of the accessory formed in accordance with an embodiment of the present invention.

Another embodiment of the projector 68 comprises a light source 75 to create a light beam 76, preferably a laser, and a deflection device 77 (FIG. 7.). The deflection device 77 comprises a mirror 78, for example, suspended rotationally or pivotally about two axes 79. The mirror 78 can be addressed by an exciter 80, e.g., piezoelectrically, magnetically, or electrostatically, into an oscillation about the two axes 79. The mirror 78 can also be rotational about one or both axes 79. For a deflection of the light beam 76 in two directions, two oscillating or rotating mirrors may be provided. The light beam 76 is deflected along a grid, e.g., a Lissajous figure over the operating surface 5.

A control device 81 switches the intensity of the light beam 76 depending on the position of the deflection device 77 in order to project symbols to the operating surface 5. A switching pattern may be provided for various required symbols, e.g., arrows, numbers, stored in a storage element of the control device 81. The switching patterns determine the intensity in reference to the angular position of the mirror 78. The intensity of the light beam 76 is reduced, as soon as the light beam 76 is located outside the area of the symbol. The switching of the intensity can occur by switching a power supply for the light source 75 via the control device 81. Furthermore, the switching may occur by an intensity modulator 82, which, e.g., includes a combination of a Pockels cell 83 to change polarization and a subsequent polarization filter 84 and/or a combination of an acoustic-optic modulator 85 to change a direction of diffraction of the light beam and a subsequent blind 86.

One embodiment provides for the projector 68 of the display device 23 displaying measurements, to also generate the light spots 26, 27 on the operating surface 5 in order to measure via the measurement device 21. An additional projector 24 of the measuring device 21 can be omitted.

The accessory 20 may comprise a tensile tape 90, which can be guided about the neck 91 or a handle of the machine drill 1. A tensioning mechanism 91 clamps the tensile tape to the machine drill 1. Instead of a tensile tape, clamps may also be clamped to the machine drill 1 via the tensioning mechanism 91.

The invention claimed is:

1. An accessory for connection to a machine drill, the accessory comprising
    a projector configured to project a first light spot and a second light spot to a work piece to be processed;
    a camera configured to record the first light spot and the second light spot in an image;
    a processing unit, which, based on a first distance of the first light spot recorded in the image from a reference point recorded in the image, and a second distance of the second light spot from the reference point recorded in the image, determines an incline of the machine drill from the work piece; and
    a display device configured to display the incline determined.

2. An accessory according to claim 1, wherein the projector emits a first light beam in a first direction to create the first light spot, emits a second light beam in a second direction to create the second light spot, and emits a third light beam to create a third light spot, wherein in reference to an optic axis of the camera, azimuth angles of the first light beam and the second light beam are different, and wherein amplitudes of the first light beam and the third light beam are different in reference to the optic axis.

3. An accessory according to claim 2, wherein the first light beam is inclined by an amplitude greater than about 10 degrees in reference to the optic axis and the third light beam is inclined by an amplitude of less than about 5 degrees in reference to the optic axis.

4. An accessory according to claim 1, wherein the camera and the projector are arranged on a platform pivotal in reference to an operating axis of the machine drill.

5. An accessory according to claim 1, wherein the projector comprises a laser light source.

6. An accessory according to claim 5, wherein a beam splitter of the laser light source is arranged downstream to split the laser light into several light beams.

7. An accessory according to claim 1, wherein the projector comprises a self-illuminating monitor and a display optic.

8. An accessory according to claim 1, wherein the display device comprises a display projector projecting the display to the work piece.

9. An accessory according to claim 8, wherein the display projector is oriented in the same direction as the camera.

10. A control method for aligning a machine drill in reference to an operating surface comprising the steps:
    projecting a first light spot and a second light spot to the operating surface with a projector;
    recording the first light spot and the second light spot in an image;
    determining a first distance of the first light spot from a reference point recorded in the image and a second distance of the second light spot from the reference point recorded in the image;
    determining an incline of the machine drill in reference to the operating surface based on the first distance and the second distance; and
    displaying the determined incline via a display device.

11. A control method according to claim 10, wherein a first light beam is emitted in a first direction to create the first light spot, a second light beam is emitted in a second direction to create the second light spot, and a third light beam is emitted in a third direction to create a third light spot, wherein the azimuth angle of the first light beam and the second light beam are different in reference to an optic axis of a camera recording the first and second light spots in the image, and wherein the amplitudes of the first light beam and the third light beam are different in reference to the optic axis.

* * * * *